Heine & VonFicht,

Faucet.

No. 102,120. Patented Apr. 19, 1870.

WITNESSES.

Chas. A. Harkness
D. J. Brown

INVENTOR.

Joseph Heinl and
John Von Ficht
By their atty
R. D. O. Smith
613 7th St.

United States Patent Office.

JOSEPH HEINE AND JOHN VONFICHT, OF TOLEDO, OHIO.

Letters Patent No. 102,120, dated April 19, 1870.

IMPROVEMENT IN FAUCETS.

The Schedule referred to in these Letters Patent and making part of the same.

*To all whom it may concern:*

Be it known that we, JOSEPH HEINE and JOHN VONFICHT, of Toledo, in the county of Lucas and State of Ohio, have invented a new and useful Improvement in Faucets; and we do hereby declare the following to be a full, clear, and exact description of the same, reference being had to the accompanying drawings, in which—

The object of our invention is to prevent drip from the stop-cock, and to prevent access of insects when the cock is employed with saccharine fluids.

That others may understand our invention, its construction and operation, we will particularly describe it.

A is an ordinary stop-cock, to be inserted into a vessel at *a*.

With such a cock there will always be more or less drip when the flow of liquid is shut off, and, when it is employed with saccharine liquids, great number of flies and other insects are attracted there, and some of them, having entered the orifice of the cock *b*, are almost always entrapped by the fresh flow when the cock is turned, and are carried down with the liquid into the vessel beneath.

Both the drip and the capture of insects in this way are justly considered objectionable.

To obviate these objections we place a small gate, D, adjusted to close tightly the orifice or outlet at the lower end of the cock *b*, and arranged to be automatically opened when the cock is turned to permit the fluid to flow.

The above-mentioned gate may be conveniently and efficiently made of a strip of spring-tempered metal B, secured at one end to the shank of the faucet, and at the other end resting against and covering the orifice or outlet of the cock *b*.

In order to permit the free end of B to possess a capability to move in a vertical or horizontal direction, as may be required, we twist said strip through one turn, as shown, and it may then move in any desired direction, and be returned by its own elasticity to its proper position.

At one side a flange, *d*, is formed, to limit the movement of the gate in one direction and to form a bearing for the cam *e*, attached to the end of the cock *b*, by means of which said gate is removed from its position over the outlet of the cock.

Figure 1:
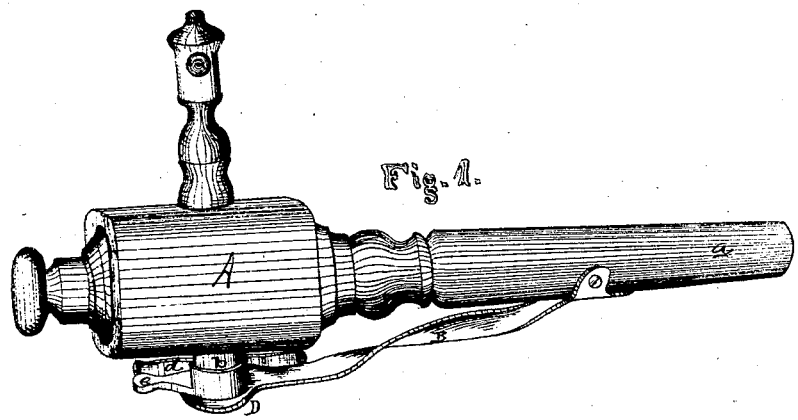
Figure 1 is a perspective view of our invention.
Figure 2:
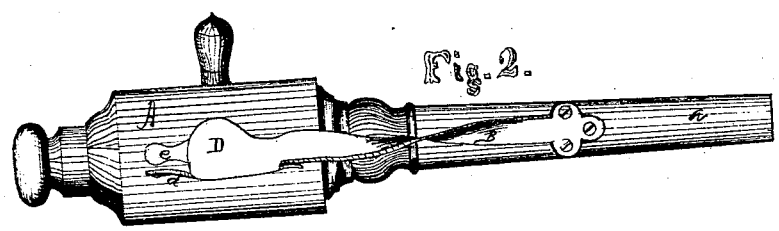
Figure 2 is a bottom plan of the same.
Figure 3:
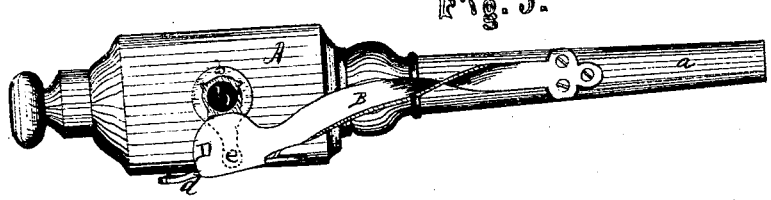
Figure 3 is a bottom plan of same with plug or cock open.

The action of the parts is clearly shown in figs. 2 and 3.

When the cock *b* is turned to permit a flow of the fluid through it, the cam *e*, partaking of the same motion, pushes the gate toward one side and uncovers the outlet of the cock.

When the cock is again turned to cut off the flow, the elasticity of the strip B causes the gate to cover the orifice of the cock and stop the drip, and exclude insects.

It is evident that the details of construction and arrangement may be greatly varied without departing from the spirit of our invention.

Having described our invention,

What we claim as new, is—

1. The combination of an ordinary stop-cock, A *b*, and a drip-gate, D, to close automatically the outlet of the cock, for the purpose set forth.

2. In combination with an ordinary stop-cock, A *b*, the gate D, constructed with the twisted strip B, flange *d* operated by the cam *e*, substantially as described.

J. HEINE.
JOHN VONFICHT.

Witnesses:
   C. E. KLIVEN,
   J. LIPPERT.